March 20, 1962  W. E. BERGMAN ET AL  3,025,965
HYDRAULIC CYCLONE UNIT

Filed Oct. 10, 1957  4 Sheets-Sheet 1

INVENTORS.
C. J. ENGLE
S. J. MARWIL
W. E. BERGMAN
BY Hudson & Young
ATTORNEYS.

March 20, 1962 W. E. BERGMAN ET AL 3,025,965
HYDRAULIC CYCLONE UNIT
Filed Oct. 10, 1957 4 Sheets-Sheet 2
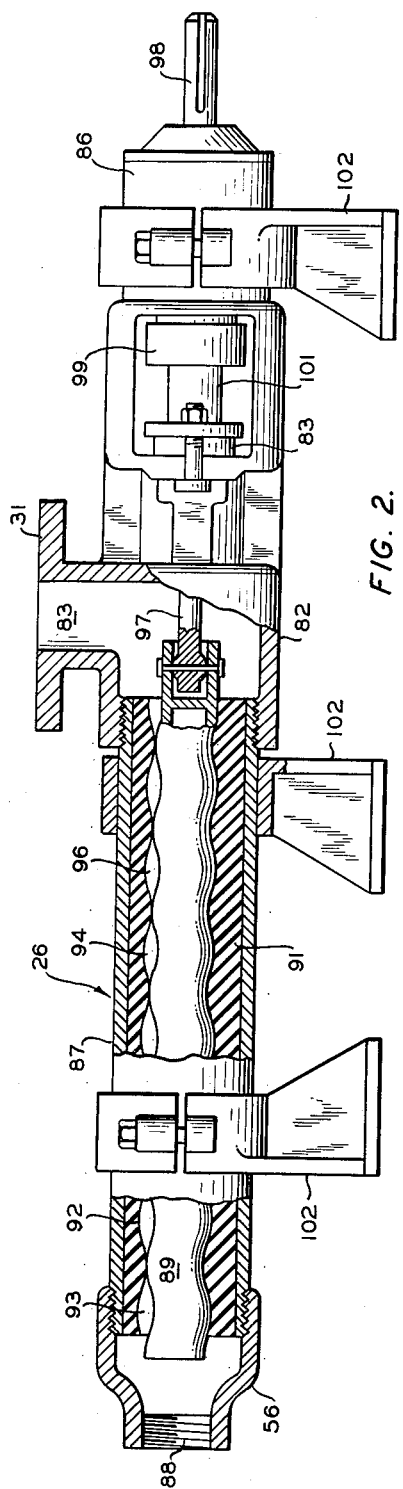
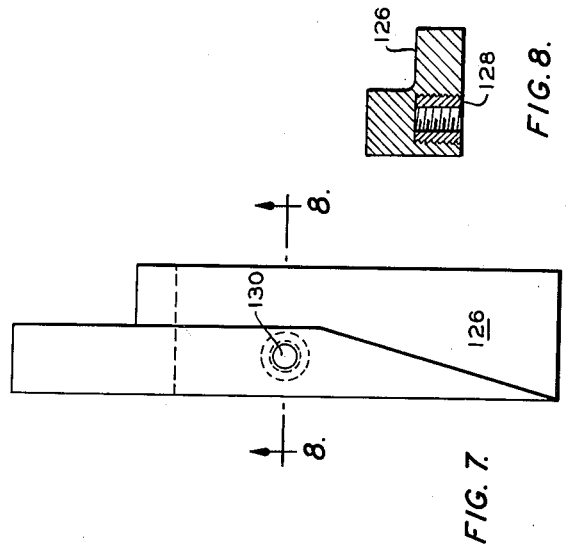
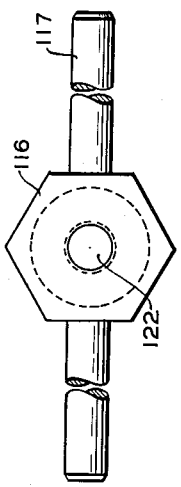
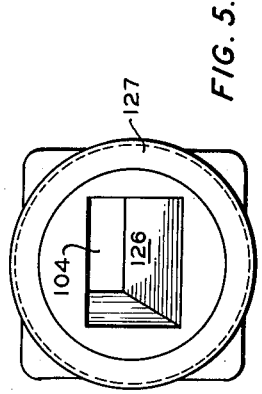
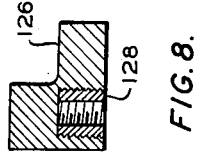
INVENTORS
C. J. ENGLE
S. J. MARWIL
BY W. E. BERGMAN
Hudson & Young
ATTORNEYS.

March 20, 1962  W. E. BERGMAN ET AL  3,025,965
HYDRAULIC CYCLONE UNIT
Filed Oct. 10, 1957  4 Sheets-Sheet 3

INVENTORS
C. J. ENGLE
S. J. MARWIL
W. E. BERGMAN
BY
Hudson & Young
ATTORNEYS.

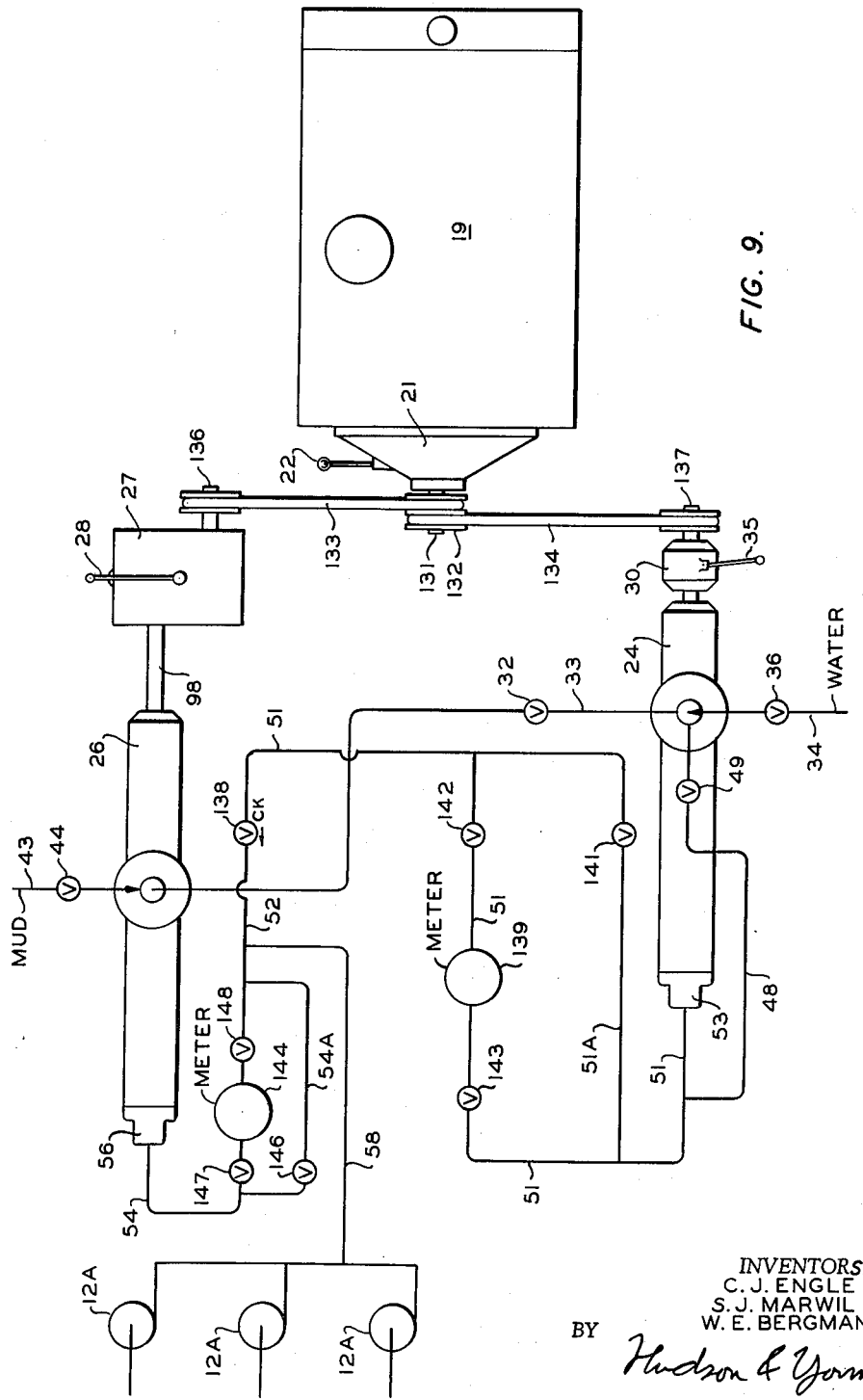

United States Patent Office 3,025,965
Patented Mar. 20, 1962

3,025,965
HYDRAULIC CYCLONE UNIT
William E. Bergman, Stanley J. Marwil, and Charles J. Engle, Bartlesville, Okla., assignors to Phillips Petroleum Company, a corporation of Delaware
Filed Oct. 10, 1957, Ser. No. 689,339
9 Claims. (Cl. 210—512)

This invention relates to hydraulic cyclone separation systems. In one aspect it relates to hydraulic cyclone systems for separating at least a portion of the larger and heavier solids which are at least temporarily suspended in a liquid rotary well drilling mud from the remainder of said mud. In another aspect it relates to a combination of a plurality of pumps for drilling mud and/or dilution water for supplying liquid to a hydraulic cyclone separator. In another aspect is relates to a plurality of mud and water pumps so arranged that the water from said water pump can be employed to clean out said mud pump and/or said mud lines before shutdown, thereby avoiding the formation of solid mud therein.

In the prior art of hydraulic cyclone separation of solids from well drilling muds considerable difficulty has been experienced. The mud is too concentrated, and we have found it needs dilution with water. Upon shutdown of the system between periods of use, the mud settles into a solid cake on the walls of the mud pump and mud lines, making it impossible to start up the unit until sufficient parts are disassembled and cleaned out to permit the mud pump to operate again. The walls of the hydraulic cyclone chamber are rapidly worn away by abrasion of the heavy undiluted mud containing abrasive solids and clays without dilution water.

The present invention avoids all these problems of the prior art by providing a plurality of pumps, of which at least one pumps mud and at least another pumps only water. By running dilution water into the mud going to the hydraulic cyclone the abrasion thereof is cut down, by making the hydraulic cyclone cone out of tungsten carbide, this reduced abrasion is reduced still further, and by pumping water from the water pump through the mud pump and lines before a shutdown the deposit of solid mud therein is eliminated.

One object is to provide an improved hydraulic cyclone separation unit.

Another object is to reduce wear therein.

Another object is to improve the hydraulic separation and reduce wear by the use of dilution water.

Another object is to provide means to clean out the mud containing portion of the system by operation of the water pumping system pumping water therethrough before shutdown.

Numerous other objects and advantages will be apparent to those skilled in the art upon reading the accompanying specification, claims, and drawings, in which:

FIGURE 2 is a cross-sectional elevational view of one of the preferred progressive cavity type pumps employed in the unit of FIGURE 1.

FIGURE 5 is an elevational view of the end of the hydraulic cyclone inlet only of FIGURES 3 and 4, but not showing the body of the separator to which the inlet is attached.

FIGURE 6 is a plan view of the valve operator of FIGURE 3.

FIGURE 7 is a detailed elevational view of the feed shim inlet shown also in FIGURE 4.

FIGURE 8 is a cross-sectional view of the feed shim inlet taken along the line 8—8 of FIGURE 7 looking in the direction indicated.

FIGURE 9 is a diagrammatic plan view of a unit similar to that in FIGURE 1, except that a plurality of hydraulic cyclones are employed in parallel and meters are employed in flow lines, showing a modified flow line system.

Figure 1:
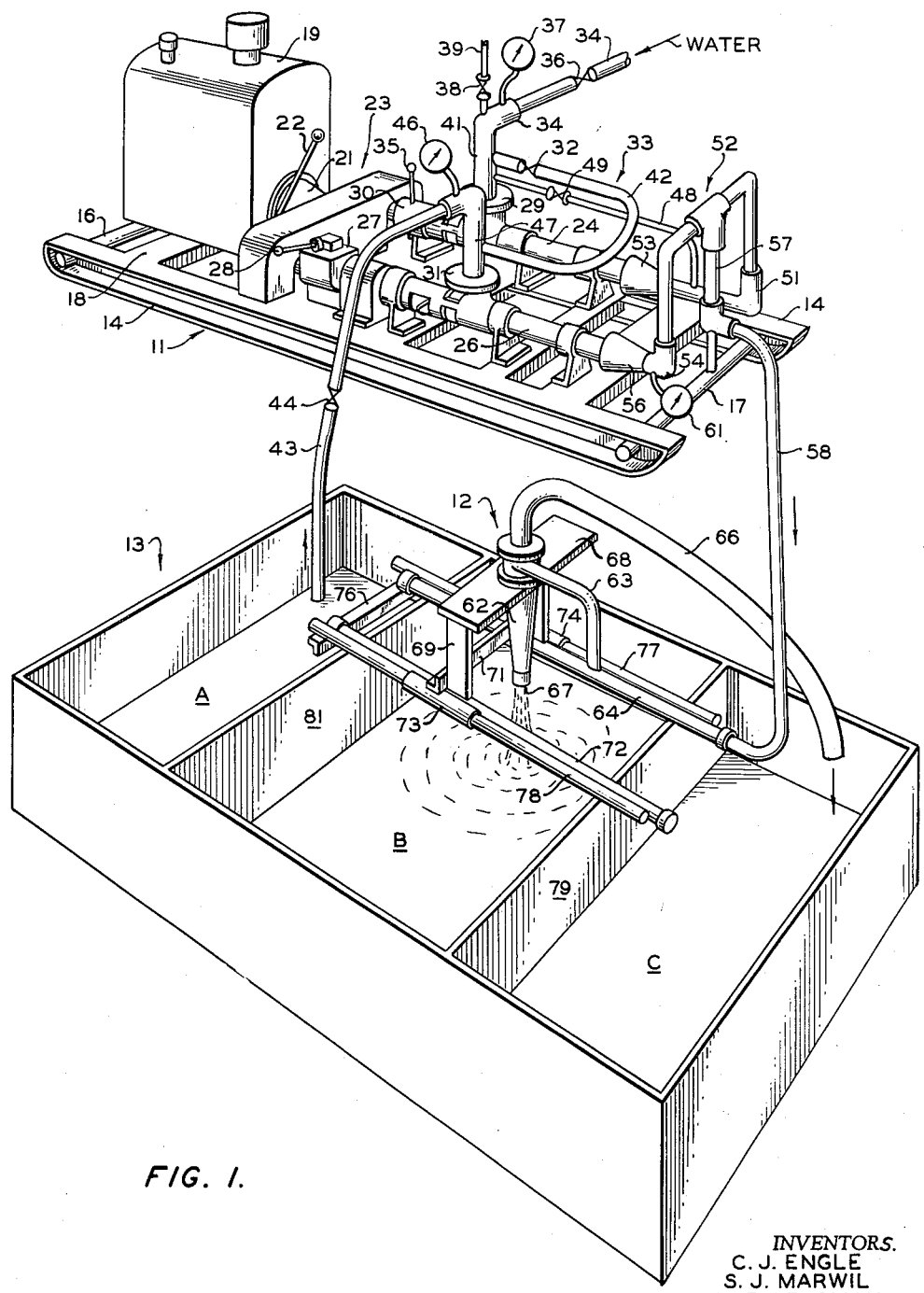
FIGURE 1 is a perspective elevational view of a hydraulic cyclone separation unit embodying the present invention.

In FIGURE 1 is shown a hydraulic cyclone separation system, known as a hydraulic cyclone unit, which comprises a motor-driven pump unit generally designated as 11 connected in communication with a hydraulic cyclone separator generally designated as 12. The hydraulic cyclone separator 12 is disposed adjacent a rotary well drilling mud pit or tank storage system generally designated as 13, and the motor-driven pump unit 11 may be adjacent units 12 and 13, or removed a considerable distance therefrom, as may be convenient, unit 11 being mounted on skids, or sled runners 14 so that it may be dragged around to a convenient location at any time desired by a tractor and chain (not shown) attached to reinforcing pipes 16 or 17.

Motor-driven pump unit 11 comprises a number of mechanical elements mounted rigidly on a frame 18, for convenience, said frame preferably consisting of parallel skids 14 secured rigidly together by cross-members including said pipes 16 and 17. The elements mounted on the frame are a prime mover 19, which could be an electric motor, or other engine known in the prior art (not shown), but which preferably in an internal combustion engine 19, most conveniently for oil field use being an engine which can run on diesel fuel, or an engine which can run on gasoline or natural gas available in the oil field, many such engines being known in the prior art, said engine 19 being connected by a clutch 21 actuated by a clutch lever 22, through a chain drive or other transmission mechanism generally designated as 23 to drive a plurality of pumps 24 and 26, there being a suitable, multiple speed, gearshift transmission 27 inserted in the transmission drive to at least one of the pumps 26, controlled by a gearshift lever 28, and preferably a clutch 30 with a clutch lever 35 in the drive to the other pump 24.

While it is preferred to employ progressive cavity type pumps of the type shown in FIGURE 2 as pumps 24 and 26, because of more accurate control of the flow rate, and other obvious advantages, it has been found useful in the practice of this invention to employ other well known types of pumps of the prior art, such as centrifugal pumps (not shown).

The intake inlet 29 of pump 24 and inlet 31 of pump 26 are connected respectively, on opposite sides of valve 32 to a liquid supply manifold generally designated 33, comprising a water supply conduit 34, water supply regulating valve 36, water pressure gauge 37, water bleed valve 38 and water bleed line 39, water pump inlet branch 41, crossover conduit 42, crossover conduit control valve 32, mud intake conduit 43, mud intake conduit control valve 44, pressure gauge 46, and mud pump inlet branch conduit 47, and to water pump inlet branch conduit 41 is preferably connected to a water pump bypass line 48 containing a regulating valve 49 leading to the water pump outlet branch conduit 51 of the pump outlet manifold generally designated as 52.

The pump outlet manifold 52 has three branches, the first branch 51 being connected through pipe reducer 53 to the outlet of pump 24, the second branch 54 being connected to the outlet of pump 26 through reducer 56, and the third branch 57 being connected to the hydraulic cyclone separator 12 through conduit 58. A pressure gauge 61 is connected to show the pressure in manifold 52. For purposes of convenience in connecting and arranging the device, any desired portion of conduits 33, 34, 43 and/or 58 may be made of flexible pipe of any type known in the prior art, there being many reinforced rubber hose connections available on the market for this purpose known as well drilling mud hose, or steam hose.

Hydraulic cyclone separator 12 comprises a generally conical body 62 having a generally tangential inlet 63 connected through supporting conduit 64 to the pump manifold at line 58, conduit 63 being disposed to inject mud and/or water from pumps 24 and/or 26 generally tangentially to and adjacent the base of the conical chamber in body 62, and body 62 is provided with an axial overflow outlet 66 adjacent the base thereof and an axial underflow outlet 67 adjacent the apex thereof. We have discovered that the preferred way to mount separator 12 is to fasten the top of body 62 to a plate 68 secured in turn rigidly to a frame comprising the vertical members 69 secured to horizontal L shaped angle 71 secured in turn to pipes 64 and 72 and sleeves 73 and 74. While this is often sufficient support, we have provided an extension to extend this support over a wider span by providing a U shaped slide member consisting of angle 76 secured to rods 77 and 78 slidably received in sleeves 74 and 73, respectively, which can be pulled out like the slide on a trombone to extend the span of the base of the support. It is obvious the support members 64, 72, 77, and 78 can be extended to bridge a rather wide mud pit, dug in the ground (not shown), or between walls 79 and 81 of the mud storage tank 13 shown in FIGURE 1.

In the practice of this invention it is necessary to have a mud storage system divided into three pits, compartments, or tanks "A," "B," and "C" by suitable partitions such as walls 79 and 81 which are impervious, or substantially so. The relative size of the tanks is not important and may differ from that shown in FIGURE 1. Tank "A" is for untreated liquid well drilling mud. Tank "B" is for receiving the underflow 67 and tank "C" is for receiving the overflow 66 of the hydraulic separator 12; and depending on the process, one of these is treated well drilling mud and the other discarded material. However, it is easy to switch tanks by merely positioning separator 12 over any one of the tanks and throwing flexible hose 66 so that it discharges in another of the tanks while flexible hose 43 is moved to whichever tank remains as the third tank. Similarly, hose 43 can be pulled out of the mud in tank "A" and connected to the water supply (presently connected to pipe 34) and pipe 34 disconnected from the water supply can be bent around and shoved into the drilling mud in tank "A." It will be obvious that we have provided a very versatile and useful combination.

FIGURE 2 is an elevational view with parts broken away in cross-section to show details of construction of one of the preferred type of progressive cavity pumps employed in the unit of FIGURE 1 and generally designated as 26. As these pumps are purchased from another company and are patented already, the description of FIGURE 2 will be made very brief. The pump comprises a main pump casing formed of pipes 56, 87 and 82 secured together. Pump 26 has a pump inlet chamber 83 in section 82, a pump inlet flange connection 31, a stuffing box 83, ball bearing housing 86, pump cylinder 87 secured to inlet section 82, and a pipe reducer 56 secured thereto. The reducer 56 has a discharge outlet 88. The helical rotor 89 is mounted inside a rubber pump liner 91 which is provided with a helical bore 92 of greater diameter than the rotor 89 so that a series of cavities 93, 94, 96, etc. exists at points along the length of the rotor 89, and as the rotor rotates these cavities progress in a direction from inlet 83 to outlet 88 so that liquid trapped therein is pumped as rotor 89 rotates. Rotor 89 is driven from shaft 97 which is secured to shaft 98 by a universal joint (not shown) inside universal housing 99 to which is attached a sealing sleeve 101 surrounding shaft 97 and sealing with stuffing box 83. Shaft 97 moves in a limited rotary movement in the locus of a cone with its apex at said universal joint as the rotor 89 slides around on the surface of the rubber helically bored sleeve 91. The pump may be secured to frame 18 by means of support brackets 102.

Figure 3:
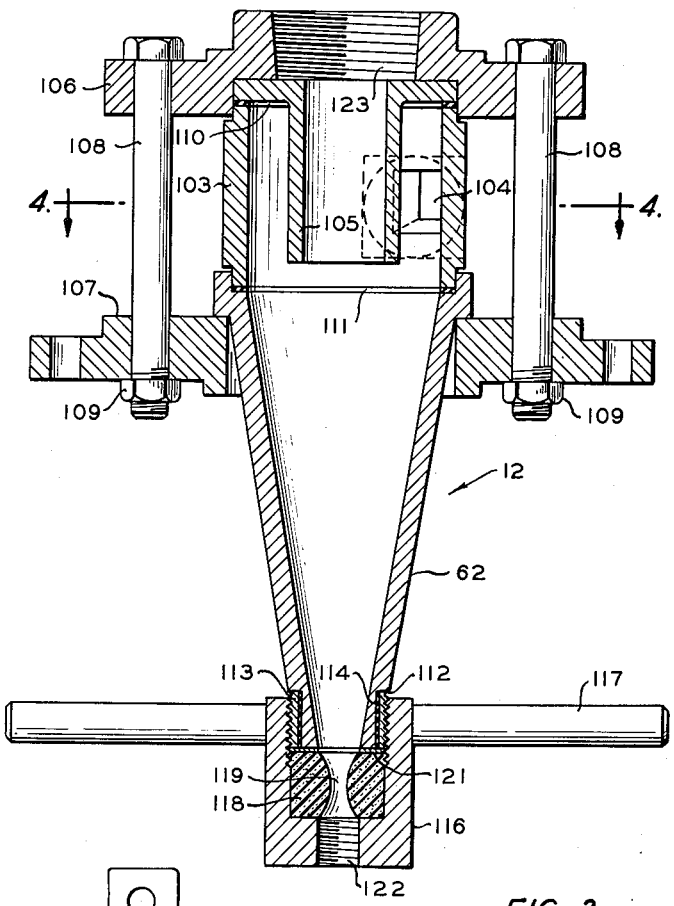
FIGURE 3 is a cross-sectional elevational view of an improved hydraulic cyclone of the type employed in the unit of FIGURE 1.

FIGURE 3 is a cross-sectional view through the hydraulic cyclone separator generally designated as 12 in FIGURE 1. It comprises a conical body 62, a cylindrical feed section 103 having a tangential feed entrance 104, and an overflow orifice or concentric cylinder 105, known sometimes as a "vortex finder" connected in series by flanges 106 and 107 connected by bolts 108 and nuts 109, preferably with rubber gaskets 110 and 111 therebetween. The abrasive action of the solid particles in the liquid drilling mud is so intense inside the hydraulic separator 12 that we have found it desirable to make parts 62, 103 and 105 out of tungsten carbide, whereas all of the other metal parts shown may be made of ordinary materials of construction, such as cast iron or carbon steel. Because part 62 is made out of tungsten carbide, it is impractical to cut threads 112 therein, so they are cut in a carbon steel cylinder 113 soldered by solder 114 to the tungsten carbide 62.

The threads 112 enable us to provide a simple regulating outlet valve comprising a steel nipple 116 threaded thereon and having means to engage and turn the same such as handles 117. Nipple 116 contains a soft resilient rubber washer 118 which is deformed to throttle the outlet 119 therethrough as nipple 116 is screwed up threads 112, and reopen said orifice 119 when nipple 116 is screwed down said threads. To reduce twisting the rubber washer 118, we preferably insert a steel slip ring or washer 121. The axial underflow outlet 122 may be provided with threads if desired to attach a dependent pipe thereto, which may be used if it is desired to increase the suction, but which has been found generally unnecessary.

The axial overflow outlet 123 is provided with suitable connecting means for connection to pipe 66, screw threads being shown as one such connecting means.

Figure 4:
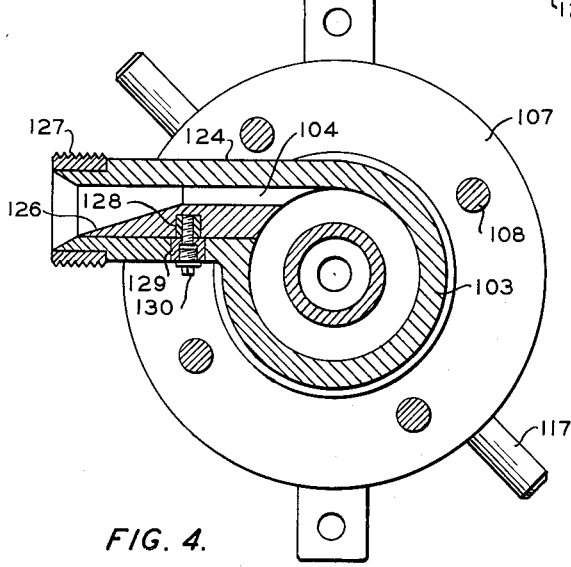
FIGURE 4 is a cross-sectional plan view taken along the line 4—4 of the device shown in FIGURE 3 looking in the direction indicated by the arrows.

FIGURE 4 is a cross-sectional view taken along the line 4—4 of FIGURE 3 looking in the direction indicated. Because the feed inlet pipe 124 containing feed inlet 104 and feed inlet shim 126 is made out of tungsten carbide, it is necessary to solder on threaded steel sleeves 127, 128, and 129 in the same manner of sleeve 112 of FIGURE 3. As the other parts are the same as in FIGURE 3, no further description is necessary.

With different compositions of well drilling mud and with different water dilutions thereof, different degrees of separation occur in the hydraulic separator with different sizes of tangential inlet 104. To vary the size of this inlet a number of different sizes of shims are provided which take up more or less the space 104, and 126 is one of these shims. It is secured in place by means of a screw having a head fitting in the enlarged bore portion of sleeve 129 and the reduced size shank threaded into sleeve 128 of the shim, the head of the screw being accessible by removing cover plate screw cap 130.

FIGURE 5 is an end view of the hydraulic cyclone inlet 104 of FIGURES 3 and 4, just showing the parts 124, 127, and 126, and omitting feed section 103 and related parts, so no further description is necessary.

FIGURE 6 is merely a view looking upward of nipple 116 and handles 117 of FIGURE 3, so no further description is necessary.

FIGURES 7 and 8 are merely two other views of shim 126 of FIGURE 4, FIGURE 8 being a cross-section along the line 8—8 of FIGURE 7, so no further description is necessary.

FIGURE 9 is a diagrammatic plan view of a unit similar to that in FIGURE 1, except that a plurality of hydraulic cyclone separators 12A are arranged in parallel, taking their feed from line 58 in place of the single hydraulic separator of FIGURE 1. In addition, some minor changes in the flow line arrangements from FIGURE 1 will be obvious, such as placing meters in certain flow lines and arranging bypasses around the meters. Prime mover 19 drives driveshaft 131, but may be disconnected from the same by clutch 21 by moving handle 22. Shaft 131 has belt drive pulleys 132 mounted thereon. Belts 133 and 134 drive shafts 136 and 137, respectively, through the driven belt pulleys shown thereon. Obviously, a chain drive or gear drive (not shown) could be substituted.

Shaft 136 drives shaft 98 of pump 26 through selective gearshift 27 controlled by shift lever 28. While the various gear ratios and number of gears may be employed, it is preferred to have a gear box 27 giving ratios between shafts 136 and 98 of 1:1, 1:2, 1:3, and 1:4, with a neutral disengaged position. Shaft 137 drives pump 24 directly, except the drive is through clutch 30 which may be disengaged by clutch operating lever 35. By adding more pulleys like 132 to shaft 131, further pumps (not shown) may be driven, which can be connected with their intakes connected to manifold 33, on either side of valve 32, and with their discharge to manifold 52 in parallel with pumps 24 and 26. The various mud and water conduits and their connections are the same in FIGURE 9 as in FIGURE 1, and they are given similar numbers with the exception that a check valve 138 is provided in line 51 to prevent any backflow of mud into the water pump 24, and liquid flowmeter 139 is provided in line 51 with a bypass 51A around the same controlled by valves 141, 142, 143, and a liquid flowmeter 144 is provided in line 52 with a bypass 54A around the same controlled by valves 146, 147, and 148. The liquid flowmeters 139 and 144 are preferably those of the prior art which indicate the rate of flow and also integrate and/or record total past volume of flow. The simplest flowmeters will give the same results as the more complete ones, but require observations and calculations with a clock, while the more complete ones give all the information possible automatically.

OPERATION

It will be noted that the water supply 34 is under sufficient pressure to get water to the top of pipe 41 without operating the pumps 24 and 26 shown in the drawing. The means for supplying this water pressure from downstream of valve 36 is not shown, but is a common feature of about all water supply pipes to supply said water under pressure. The mud suction pipe 43, however, often has to elevate the mud several feet by means of pump 26 without the aid of any pressure on the mud in tank A except the normal atmospheric pressure of the air on the surface of the mud. Sometimes pump unit 23 is positioned below the surface of the mud in tank A, in which case pipe 43 may form a siphon.

While pumps 24 and 26 may be of a type not requiring priming, it is often desirable to prime the pumps before connecting power to the same by engaging clutch 22; and if the pumps are of the progressive cavity type shown in FIGURE 2, it is very strongly recommended that clutch 22 should not be engaged unless the pumps 24 and 26 are primed, if the operator wishes to get long life and satisfactory operation from his pumps.

The operator starts engine 19 with clutch 22 disengaged and primes pumps 24 and 26 by opening valves 36, 38, 32 and 44 and then closing valves 44, 32, and 38, valve 49 remaining closed throughout. Excess air bleeds out through valve 38 while it is open, and bleed valves (not shown) similar to 38 can be provided in any high point where air tends to be trapped. The operator places gear lever 28 in the desired speed for operation of the mud pump 26 at a selected ratio to the water pump 24. If he desires to use water pump 24 he engages clutch 35; if he does not wish to use pump 24 he disengages clutch 35 and closes valve 36. Valve 44 is opened and clutch 22 is engaged, whereupon pump 26 pumps mud from tank A into hydraulic cyclone separator 12 through tangential pipe 63, and pump 24 pumps water, or is idle depending on the position of clutch 35, the water passing through pipe 51 into said tangential pipe 63 along with the mud.

The setting of gearshift lever 28 governs the proportional amounts of water and mud pumped to four different ratios, but smaller changes intermediate those ratios may be made by opening valve 49 and allowing more or less of the water being pumped by pump 24 to recycle back through pipe 48 and valve 49 to intake 41 of the said water pump.

For solids removal from unweighted muds whereby drilled solids and sand are concentrated and removed from the mud, it is undesirable to employ pump 24 as a water pump because adding water reduces the total volume of mud that can be concentrated and also reduces the concentration of the mud at the very time it is being concentrated. So in such operations valve 36 is closed and valve 32 is opened so that all of the pump intake manifold 33 acts to supply mud to both pumps 24 and 26. In this operation tank B contains the waste material which is being discarded through underflow outlet 67, namely, concentrated sand and drilling cuttings, whereas the portion of the mud which is being preserved goes out the top of separator 12 through pipe 66 into tank C.

However, if the operation is the recovery of valuable weighting material, such as barite, from weighted muds, we have found that the addition of water to dilute the drilling mud going through tangential pipe 63 into separator 12 is most advantageous, and therefore valve 32 is closed and valve 36 is opened so that pump 24 pumps water and pump 26 pumps mud as a diluted mixture through pipe 58.

By powdered mineral weighting agent it is intended to include all such known to the prior art as well drilling mud weighting agents, such as barium sulfate (barite or barytes) $BaSO_4$, the various lead oxides, chiefly litharge PbO and red lead $Pb_3O_4$, the iron oxides, chiefly magnetite $Fe_3O_4$ and hematite $Fe_2O_3$, and powdered iron, lead or other heavy metals and their solid oxides or other water insoluble stable compounds. In practice, barium sulfate is so superior in its reduced relative corrosion of, and abrasiveness to, the well equipment, that it is vastly preferred over the others.

When the operation is the concentration and recovery of the relatively expensive powdered mineral weighting agent in the drilling mud, then of course tank B contains the recovered product coming from underflow outlet 67 and tank C contains the discarded materials coming from overflow outlet 66.

However, whichever type operation has been performed, it is desirable to finish up with clean apparatus, as the drilling mud has a tendency to set into a cake, and even to plug pipes up, if thick enough, so when the operations are almost completed valves 36 and 32 are opened and the valve 44 is closed so that water from 34 may flush out the entire system including pipe 43, pumps 24 and 26, manifolds 33 and 52, and hydraulic cyclone separator 12, after which valve 36 is closed, clutch 22 disengaged, and engine 19 shut off.

As an example of the types of operations possible with the present invention, Table I is illustrative of the results that may be expected in removing drilling solids from unweighted drilling mud, whereas Table II is representative of the results that may be expected in the recovery of barite:

TABLE I

*Removal of Drilled Solids From Unweighted Gulf Coast Muds Using the 3-Inch Diameter Cyclone*

| Test No. | 1 | 2 | 3 | 4 | 5 |
|---|---|---|---|---|---|
| Orifice area, sq. in.: | | | | | |
| Feed | 0.3 | 1.0 | 0.2 | 0.2 | 0.3 |
| Overflow | 0.2 | 0.5 | 0.2 | 0.4 | 0.4 |
| Underflow | 0.2 | 0.2 | 0.1 | 0.2 | 0.2 |
| Pressure, p.s.i. | 60 | 155 | 180 | 180 | 115 |
| Flow rates, g.p.m.: | | | | | |
| Mud | 34 | 61 | 36 | 50 | 52 |
| Overflow | 31 | 58 | 34 | 44 | 48 |
| Underflow | 2.8 | 2.3 | 1.8 | 6.1 | 4.1 |
| Density, lb. per gal.: | | | | | |
| Mud | 9.9 | 9.75 | 9.7 | 10.0 | 9.9 |
| Overflow | 9.3 | 9.3 | 9.4 | 9.4 | 9.4 |
| Underflow | 14.0 | 15.55 | 16.25 | 15.3 | 15.8 |
| Solids, percent by wt.: | | | | | |
| Mud | 25.8 | 23.7 | 23.0 | 28.7 | 26.5 |
| Overflow | 16.8 | 16.8 | 18.4 | 18.4 | 19.9 |
| Underflow | 66.0 | 75.7 | 79.0 | 74.0 | 76.8 |
| Solids removed in underflow: | | | | | |
| Lb./lb. in feed | 0.37 | 0.23 | 0.28 | 0.48 | 0.36 |
| Tons per day | 18 | 20 | 16 | 50 | 36 |
| Dilution savings, percent | 82 | 90 | 92 | 86 | 89 |

TABLE II

*Recovery of Barite From Gulf Coast Muds With the 3-Inch Diameter Cyclone*

| Test No. | 6 | 7 | 8 | 9 | 10 |
|---|---|---|---|---|---|
| Orifice area, sq. in.: | | | | | |
| Feed | 0.2 | 0.5 | 0.5 | 0.5 | 0.2 |
| Overflow | 0.2 | 0.8 | 0.4 | 0.4 | 0.4 |
| Underflow | 0.1 | 0.2 | 0.2 | 0.2 | 0.2 |
| Pressure, p.s.i. | 190 | 97 | 155 | 155 | 170 |
| Flow rates, g.p.m.: | | | | | |
| Mud | 17.7 | 14.9 | 14.3 | 18.6 | 17.7 |
| Water | 18.5 | 55.0 | 55.0 | 56.8 | 34.5 |
| Overflow | 33.5 | 66.0 | 64.1 | 68.6 | 47.9 |
| Underflow | 2.7 | 3.9 | 5.2 | 6.8 | 4.3 |
| Density, lb. per gal.: | | | | | |
| Mud | 11.1 | 14.0 | 14.0 | 14.9 | 15.6 |
| Overflow | 8.8 | 8.8 | 8.5 | 8.7 | 8.5 |
| Underflow | 18.5 | 21.4 | 20.2 | 20.7 | 20.6 |
| Solids, percent by wt.: | | | | | |
| Mud | 38.5 | 56.3 | 56.3 | 58.6 | 65.2 |
| Overflow | 10.5 | 8.9 | 4.5 | 5.8 | 4.4 |
| Underflow | 79.4 | 81.8 | 79.5 | 79.8 | 79.2 |
| Density of solids, g./cc.: | | | | | |
| Mud | 3.41 | 3.94 | 4.00 | 3.95 | 3.82 |
| Overflow | 3.15 | 3.59 | 3.12 | 3.31 | 3.30 |
| Underflow | 3.53 | 4.05 | 4.11 | 4.18 | 4.08 |
| Barite in solids, percent by weight: | | | | | |
| Mud | 59.8 | 86.0 | 88.5 | 88.4 | 80.0 |
| Overflow | 43.8 | 69.0 | 41.6 | 54.5 | 53.5 |
| Underflow | 66.5 | 90.7 | 93.2 | 96.0 | 91.0 |
| Barite savings: | | | | | |
| Percent [1] | 46 | 64 | 91 | 84 | 71 |
| Tons per day | 19 | 45 | 56 | 78 | 46 |

[1] The percent saved is the value computed from the ratios of barite to clay in the mud and overflow, and hence is the savings over pit jetting. The value for tons per day is the amount returned by the sludge.

It should be apparent that the objects of the invention set forth above are all achieved by the novel and useful combination of parts disclosed, and while some specific embodiments of the invention have been shown for purposes of illustration, it is obvious the invention is not limited thereto.

Having described our invention, we claim:

1. A hydraulic cyclone separation system comprising in combination a separator having a generally conical separation chamber with an inlet disposed generally tangentially to the side of and adjacent the base of the cone of said chamber, an axial underflow outlet adjacent the apex of said cone, and an axial overflow outlet adjacent the base of said cone, said separator being made in three parts, each part being made of tungsten carbide and having one of said inlet or outlets formed therein, and means clamping the three parts together, and means for supplying water and drilling mud under pressure to said inlet comprising a plurality of progressive cavity pumps, an intake manifold for said pumps, a water intake conduit connected to a source of water and to said manifold, a first valve controlling flow therethrough, a drilling mud intake conduit connected to a source of drilling mud and to said manifold, a second valve controlling flow therethrough, the intakes of said pumps being connected to said intake manifold, a valve in said manifold between said pump intakes and between the connection of said conduits with said manifold controlling flow between the same, and an outlet manifold connected to combine and mix the output of the outlet conduits of said pumps, said outlet manifold being connected to said inlet of said separator chamber, one of said pumps being driven through a clutch by a prime mover, and one of said pumps being driven through a selective speed transmission by a prime mover, whereby the system can pump water and drilling mud in desired ratios to said separation chamber.

2. A hydraulic cyclone separation system comprising in combination a separator having a generally conical separation chamber with an inlet disposed generally tangentially to the side of and adjacent to the base of the cone of said chamber, an axial underflow outlet adjacent the apex of said cone, and an axial overflow outlet adjacent the base of said cone, and means for supplying water and drilling mud under pressure to said inlet comprising a plurality of progressive cavity pumps, an intake manifold for said pumps, a source of water connected to a water intake conduit and to said manifold, a first valve controlling flow therethrough, a source of drilling mud connected to a drilling mud intake conduit and to said manifold, a second valve controlling flow therethrough, the intakes of said pumps being connected to said intake manifold, a valve in said manifold between said pump intakes and between the connection of said conduits with said manifold controlling flow between the same, and an outlet manifold connected to combine and mix the output of the outlet conduits of said pumps, said outlet manifold being connected to said inlet of said separator chamber, one of said pumps being driven through a clutch by a prime mover, and one of said pumps being driven through a selective speed transmission by a prime mover, whereby the system can pump water and drilling mud in desired ratios to said separation chamber.

3. A hydraulic cyclone separation system comprising in combination a separator having a generally conical separation chamber with an inlet disposed generally tangentially to the side of and adjacent the base of the cone of said chamber, an axial underflow outlet adjacent the apex of said cone, and an axial overflow outlet adjacent the base of said cone, said separator being made in three parts, each part being made of tungsten carbide and having one of said inlet or outlets formed therein, and means clamping the three parts together, and means for supplying water and drilling mud under pressure to said inlet comprising a plurality of pumps, an intake manifold for said pumps, a source of water connected to a water intake conduit and to said manifold, a first valve controlling flow therethrough, a source of drilling mude connected to a mud intake conduit and to said manifold, a second valve controlling flow therethrough, the intakes of said pumps being connected to said intake manifold, a valve in said manifold between said pump intakes and between the connection of said conduits with said manifold controlling flow between the same, and an outlet manifold connected to combine and mix the output of the outlet conduits of said pumps, said outlet manifold being connected to said inlet of said separator chamber, whereby the system can pump water and drilling mud in desired ratios to said separation chamber.

4. A hydraulic cyclone separation system comprising in combination a separator having a generally conical separation chamber with an inlet disposed generally tangentially to the side of and adjacent the base of the cone of said chamber, an axial underflow outlet adjacent the apex of said cone, and an axial overflow outlet adjacent the base of said cone, and means for supplying water and drilling mud under pressure to said inlet comprising a plurality of pumps, an intake manifold for said pumps, a source of water connected to a water intake conduit and to said manifold, a first valve controlling flow therethrough, a source of drilling mud connected to a drilling mud intake conduit and to said manifold, a second valve controlling flow therethrough, the intakes of said pumps being connected to said intake manifold, a valve in said manifold between said pump intakes and between the connection of said conduits with said manifold controlling flow between the same, and an outlet manifold connected to combine and mix the output of the outlet conduits of said pumps, said outlet manifold being connected to said inlet of said separator chamber, whereby the system can pump water and drilling mud in desired ratios to said separation chamber.

5. In the combination of claim 1 said outlet conduits of said pumps each containing a flowmeter, a by-pass conduit disposed around each flowmeter, and valve means in said outlet and by-pass conduits controlling flow therethrough.

6. A hydraulic cyclone separation system comprising in combination a hydraulic cyclone separator having a generally conical separation chamber formed from a circular cross section inlet member having an inlet disposed generally tangentially to its inner circular wall, connected in communication with the base of a generally conical separation member having an axial underflow outlet adjacent its apex, said inlet member being connected in communication with an annular cover having a vortex finder duct depending into the inlet member along its axis adjacent the base of said conical separation member, said inlet member, said separation member, and said annular cover being made of tungsten carbide which is too hard to machine easily and having one of said inlet or outlets formed therein, and means clamping said members together in connection with each other, and means for supplying water and drilling mud under pressure to said inlet comprising a plurality of progressive cavity pumps, an intake manifold for said pumps, a water intake conduit connected to a source of water and to said manifold, a first valve controlling flow therethrough, a drilling mud intake conduit connected to a source of drilling mud and to said manifold, a second valve controlling flow therethrough, the intakes of said pumps being connected to said intake manifold, a valve in said manifold between said pump intakes and between the connection of said conduits with said manifold controlling flow between the same, and an outlet manifold connected to combine and mix the output of the outlet conduits of said pumps, said outlet manifold being connected to said inlet of said separator chamber, one of said pumps being driven through a clutch by a prime mover, one of said pumps being driven through a selective speed transmission by a prime mover, said outlet conduits of said pumps each containing a flowmeter, a by-pass conduit disposed around each flowmeter, and valve means in said outlet and by-pass conduits controlling flow therethrough, whereby the system can pump water and drilling mud in desired ratios to said separation chamber.

7. The combination of claim 6 in which rubber packing is provided between the tungsten carbide members to seal the spaces therebetween.

8. The combination of claim 6 in which screw threads are provided on the tungsten carbide members by soldering carbon steel sleeves on which threads are cut to the tungsten carbide members.

9. A hydraulic cyclone separation system suitable for separation treatment of a drilling mud comprising a prime mover, a plurality of pumps driven by said prime mover, an inlet manifold with a pump supplying branch connected to the inlet of each pump, a valve in said manifold at a point between two of said pump supplying branches, a water supply connected by a water supply line to said inlet manifold on one side of said valve, a drilling mud supply connected by a mud supply line to said inlet manifold on the other side of said valve, a valve in each of said supply lines, a hydraulic cyclone separator having a generally conical separation chamber with an inlet disposed generally tangential to the side of and adjacent the base of the cone forming said conical chamber, an axial underflow outlet adjacent the apex of said cone, and an axial overflow outlet adjacent the base of said cone, and an outlet manifold connected to combine and mix the output of said pumps and feed the same into said tangentially disposed inlet of said separator whereby the system can pump water and mud in desired ratios to said separation chamber.

References Cited in the file of this patent

UNITED STATES PATENTS

| | | |
|---|---|---|
| 302,065 | Walker | July 15, 1884 |
| 453,105 | Bretney | May 26, 1891 |
| 840,065 | Jones | Jan. 1, 1907 |
| 1,147,401 | Huttner | July 20, 1915 |
| 1,755,000 | Haentjens | Apr. 15, 1930 |
| 2,094,192 | Schmidt | Sept. 28, 1937 |
| 2,109,331 | Cornell | Feb. 22, 1938 |
| 2,244,106 | Granberg | June 3, 1941 |
| 2,346,005 | Bryson | Apr. 4, 1944 |
| 2,362,724 | Shea | Nov. 14, 1944 |
| 2,376,917 | Hiltz | May 29, 1945 |
| 2,381,814 | Eves | Aug. 7, 1945 |
| 2,463,341 | Wade | Mar. 1, 1949 |
| 2,594,064 | O'Leary | Apr. 22, 1952 |
| 2,622,735 | Criner | Dec. 23, 1952 |
| 2,649,963 | Fontein | Aug. 25, 1953 |
| 2,691,346 | Conery | Oct. 12, 1954 |
| 2,754,968 | Vegter et al. | July 17, 1956 |
| 2,765,918 | Fontein | Oct. 9, 1956 |
| 2,775,349 | Boadway | Dec. 25, 1956 |
| 2,795,278 | Battle | June 11, 1957 |
| 2,801,697 | Rohrback | Aug. 6, 1957 |

FOREIGN PATENTS

| | | |
|---|---|---|
| 769,906 | Great Britain | Mar. 13, 1957 |

UNITED STATES PATENT OFFICE
CERTIFICATE OF CORRECTION

Patent No. 3,025,965                March 20, 1962

William E. Bergman et al.

It is hereby certified that error appears in the above numbered patent requiring correction and that the said Letters Patent should read as corrected below.

Column 8, line 18, strike out "to", second occurrence; line 55, for "mude" read -- mud --; same column 8, line 56, before "mud" insert -- drilling --.

Signed and sealed this 4th day of September 1962.

(SEAL)
Attest:

ERNEST W. SWIDER
Attesting Officer

DAVID L. LADD
Commissioner of Patents